US010352395B2

(12) United States Patent
Yasuda et al.

(10) Patent No.: US 10,352,395 B2
(45) Date of Patent: Jul. 16, 2019

(54) VIBRATION-DAMPING ELECTROMAGNETIC ACTUATOR, ACTIVE FLUID-FILLED VIBRATION-DAMPING DEVICE AND ACTIVE VIBRATION-CONTROL DEVICE USING THE SAME

(71) Applicant: SUMITOMO RIKO COMPANY LIMITED, Komaki-shi, Aichi (JP)

(72) Inventors: Takayoshi Yasuda, Komaki (JP); Hironori Koyama, Komaki (JP); Masahiko Nagasawa, Komaki (JP); Yushi Hashimoto, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 12 days.

(21) Appl. No.: 15/475,642

(22) Filed: Mar. 31, 2017

(65) Prior Publication Data
US 2017/0204935 A1 Jul. 20, 2017

Related U.S. Application Data

(63) Continuation of application No. PCT/JP2015/080947, filed on Nov. 2, 2015.

(30) Foreign Application Priority Data

Nov. 26, 2014 (JP) .................................. 2014-238838

(51) Int. Cl.
*F16F 13/26* (2006.01)
*F16F 13/08* (2006.01)
(Continued)

(52) U.S. Cl.
CPC ............ *F16F 13/26* (2013.01); *B60K 5/1208* (2013.01); *B60K 5/1283* (2013.01); *F16F 13/08* (2013.01);
(Continued)

(58) Field of Classification Search
CPC .......... F16F 13/08; F16F 13/26; F16F 15/005; F16F 2222/06
See application file for complete search history.

(56) References Cited

U.S. PATENT DOCUMENTS 6,105,943 A   8/2000 Nagasawa
6,145,802 A * 11/2000 Nakagaki .............. F16F 13/264
                                                248/636
(Continued)

FOREIGN PATENT DOCUMENTS

JP   2010-107000 A   5/2010
JP   2010-253422 A   11/2010
(Continued)

OTHER PUBLICATIONS

Jun. 8, 2017 International Preliminary Report on Patentability issued in International Patent Application No. PCT/JP2015/080947.
(Continued)

*Primary Examiner* — Thomas J Williams
*Assistant Examiner* — James K Hsiao
(74) *Attorney, Agent, or Firm* — Oliff PLC (57) ABSTRACT

A vibration-damping electromagnetic actuator including: a tubular stator including at least one coil member having a coil and an outer yoke attached to the coil; a mover including a permanent magnet and at least one inner yoke superposed in an axial direction of the stator, the mover being inserted into the tubular stator as axially displaceable relative to the stator through energization to the coil; and an inner tubular part provided at the outer yoke being superposed on an inner peripheral face of the coil to have a magnetic gap, wherein the at least one inner yoke has a thick part at an outer peripheral part thereof, and a lightening part at an inner
(Continued)

peripheral part thereof so that an axial dimension of the inner yoke is smaller in a formation part of the lightening part than in the thick part.

8 Claims, 4 Drawing Sheets (51) Int. Cl.
    *H02K 33/16*     (2006.01)
    *B60K 5/12*     (2006.01)
    *F16F 15/00*     (2006.01)
    *F16F 15/02*     (2006.01)

(52) U.S. Cl.
    CPC .......... *F16F 13/264* (2013.01); *F16F 15/005* (2013.01); *F16F 15/022* (2013.01); *H02K 33/16* (2013.01); *F16F 2222/06* (2013.01); *F16F 2224/025* (2013.01); *H02K 2213/03* (2013.01)

(56) References Cited

U.S. PATENT DOCUMENTS

| | | | | |
|---|---|---|---|---|
| 6,565,072 B2* | 5/2003 | Goto | ............... | F16F 7/1011 267/140.14 |
| 7,276,823 B2* | 10/2007 | Ichikawa | ............... | F16F 13/264 310/23 |
| 7,710,225 B2* | 5/2010 | Uni | ............... | H01F 7/1607 335/103 |
| 8,573,569 B2* | 11/2013 | Hasegawa | ............... | F16F 7/1011 248/569 |
| 8,919,748 B2* | 12/2014 | Urayama | ............... | F16F 7/1011 267/140.14 |
| 2006/0097587 A1* | 5/2006 | Ichikawa | ............... | F16F 13/264 310/23 |
| 2011/0057367 A1 | 3/2011 | Hasegawa et al. | | |
| 2014/0096677 A1 | 4/2014 | Gaufin | | |

FOREIGN PATENT DOCUMENTS

| | | |
|---|---|---|
| JP | 5170545 B2 | 3/2013 |
| JP | 2013-060963 A | 4/2013 |
| JP | 5496822 B2 | 5/2014 |
| WO | 2010/116704 A1 | 10/2010 |

OTHER PUBLICATIONS

May 21, 2018 Office Action issued in Japanese Patent Application No. 2014-238838.

Jan. 26, 2016 International Search Report issued in International Patent Application No. PCT/JP2015/080947.

Sep. 5, 2018 Office Action issued in Chinese Patent Application No. 201580061182.6.

* cited by examiner

VIBRATION-DAMPING ELECTROMAGNETIC ACTUATOR, ACTIVE FLUID-FILLED VIBRATION-DAMPING DEVICE AND ACTIVE VIBRATION-CONTROL DEVICE USING THE SAME

INCORPORATED BY REFERENCE

The disclosure of Japanese Patent Application No. 2014-238838 filed on Nov. 26, 2014 including the specification, drawings and abstract is incorporated herein by reference in its entirety. This is a Continuation of International Application No. PCT/JP2015/080947 filed on Nov. 2, 2015.

BACKGROUND OF THE INVENTION

1. Field of the Invention

The present invention relates to a vibration-damping electromagnetic actuator that generates driving force of a mover in relation to a stator through energization to a coil, an active fluid-filled vibration-damping device that applies the force generated by the vibration-damping electromagnetic actuator to a fluid chamber in order to reduce vibration in an offset fashion, and an active vibration-control device that reduces vibration of a member subject to vibration-damping by the force generated by the vibration-damping electromagnetic actuator.

2. Description of the Related Art

From the past, for an active fluid-filled vibration-damping device, an active vibration-control device and the like, a vibration-damping electromagnetic actuator has been used as an actuator that generates oscillation force. For example, as Japanese Patent No. JP-B-5170545 discloses, the vibration-damping electromagnetic actuator has a structure wherein a mover is inserted in a tubular stator such that a mover is allowed to displace relative to the stator. Moreover, the stator includes a coil member having a structure wherein an outer yoke is attached to a coil, while the mover has a structure wherein the permanent magnet and the inner yoke are superposed to one another in the axial direction of the stator. Furthermore, a magnetic gap is provided in an inner tubular part of the outer yoke superposed on the inner peripheral face of the coil, so that the effect of the magnetic field formed through energization to the coil displaces the mover relative to the stator in the axial direction.

For the vibration-damping electromagnetic actuator, the frequency range wherein operation is effectively controllable is affected by the mass of the mover. Thus, weight reduction of the mover enables control of the operation at a higher frequency range, thereby making it possible to set broadly a frequency range wherein the operation is controllable.

However, adopting a smaller permanent magnet for weight reduction of the mover will reduce a force acting on the mover during the energization to the coil. This may cause difficulty in obtaining necessary oscillation force in the vibration-damping device or vibration-control device. When a thickness of the inner yoke is reduced for saving its weight, it becomes difficult to dispose the inner yoke close enough to the inner tubular part of the outer yoke where a magnetic pole is formed through the energization to the coil. As a result, a generated force of the actuator becomes small.

SUMMARY OF THE INVENTION

The present invention has been developed in view of the above-described matters as the background, and it is an object of the present invention to provide a vibration-damping electromagnetic actuator with a novel structure which is able to control the operation even at a higher frequency range and obtain the generated force large enough.

Moreover, it is another object of the present invention to provide an active fluid-filled vibration-damping device and an active vibration-control device with a novel structure including the vibration-damping electromagnetic actuator that exhibits the above-described effects.

The above and/or optional objects of this invention may be attained according to at least one of the following modes of the invention. The following modes and/or elements employed in each mode of the invention may be adopted at any possible optional combinations.

Specifically, a first mode of the present invention provides a vibration-damping electromagnetic actuator comprising: a tubular stator including at least one coil member having a coil and an outer yoke attached to the coil; a mover including a permanent magnet and at least one inner yoke superposed on the permanent magnet in an axial direction of the stator, the mover being inserted into the tubular stator such that the mover is displaceable relative to the stator in the axial direction through energization to the coil; and an inner tubular part provided at the outer yoke being superposed on an inner peripheral face of the coil such that a magnetic gap is formed at the inner tubular part, wherein the at least one inner yoke has a thick part with a large axial dimension at an outer peripheral part thereof, and a lightening part provided at an inner peripheral part thereof so that an axial dimension of the inner yoke is smaller in a formation part of the lightening part than in the thick part.

According to this vibration-damping electromagnetic actuator constructed following the first mode, the outer peripheral part of the inner yoke is a thick part with a great axial dimension. This makes it possible to set a small separation distance between the inner yoke and the end of the inner tubular part of the outer yoke on the side of the magnetic gap. Therefore, a strong magnetic force can act between the inner yoke and the outer yoke during the energization to the coil, thereby efficiently getting the target generated force.

Additionally, the lightening part is provided in the inner peripheral part of the inner yoke so that the axial dimension of the inner yoke is smaller in the formation part of the lightening part than in the thick part. This lightens the inner yoke, thereby enabling control of displacement of the mover relative to the stator also at a higher frequency. Besides, an axial end face of the inner yoke is superposed on the permanent magnet, while the outer peripheral face of the inner yoke is disposed on the side of the inner tubular part of the outer yoke. By so doing, the magnetic flux density of the inner peripheral part of the inner yoke is smaller than that of the outer peripheral part of the inner yoke. This avoids reduction in the generated force due to saturation of the magnetic flux, if the lightening part is formed in the inner peripheral part of the inner yoke.

A second mode of the present invention provides the vibration-damping electromagnetic actuator according to the first mode, wherein the at least one coil member comprises two coil members and the stator includes the two coil members superposed to one another in the axial direction, while the at least one inner yoke comprises two inner yokes, and the mover includes the two inner yokes superposed on opposite faces of the permanent magnet, and the thick part and the lightening part are provided in each of the inner yokes.

According to the second mode, the magnetic effect between the two coil members and the two inner yokes enables obtainment of a greater generated force. Besides, the thick part and the lightening part are provided in each of the inner yokes. Owing to this, the target generated force is effectively obtained, and an expand of the frequency range wherein the operation is controllable is also realized.

A third mode of the present invention provides the vibration-damping electromagnetic actuator according to the second mode, wherein with respect to the inner tubular part of the outer yoke, an axial dimension from the magnetic gap to an axially outer end is greater than an axial dimension from the magnetic gap to an axially inner end.

According to the third mode, increasing the winding number of each coil in the structure of two coil members superposed in the axial direction intensifies the magnetic field formed during the energization to the coil, thereby effectively getting the generated force. In addition, the position of the magnetic gap is set rather on the axially inside in the inner tubular part. As a result, if the axial dimension of the coil is increased, it is possible to dispose each inner yoke in a prescribed axial position relative to the magnetic gap without needing a mover that is larger in the axial direction.

A fourth mode of the present invention provides the vibration-damping electromagnetic actuator according to any one of the first to third modes, wherein the lightening part has a recess shape, and the formation part of the lightening part in the at least one inner yoke is a thin part with a smaller axial dimension than the axial dimension of the thick part.

According to the fourth mode, the lightening part does not pierce the inner yoke but it has a recess shape, so that the inner yoke is superposed on the permanent magnet with a wider area. By this wider area, the permanent magnet causes stronger magnetization to the inner yoke, thereby attaining a greater generated force. This also facilitates expansion of the cross sectional area of the magnetic path in the inner yoke, thereby enabling prevention of the reduction in the generated force due to the saturation of the magnetic flux.

A fifth mode of the present invention provides the vibration-damping electromagnetic actuator according to the fourth mode, wherein superposed faces of the permanent magnet and the at least one inner yoke are flat faces expanding in an axis-perpendicular direction, and the thick part is formed with a ring shape at the outer peripheral part of the inner yoke so as to extend in a peripheral direction, while the lightening part is formed in the recess shape opening to an opposite face to the permanent magnet, across an entire inner peripheral side part of the thick part in the inner yoke.

According to the fifth mode, the entire inner peripheral part of the inner yoke is the thin part, thereby lightening the inner yoke more effectively. Moreover, the outer peripheral part of the inner yoke is the thick part provided across the entire periphery, thereby enabling effective obtainment of the generated force that is exhibited during the energization to the coil. Furthermore, the superposed faces of the permanent magnet and the inner yoke are largely secured, so that the magnetic flux of the permanent magnet efficiently affects and strongly magnetizes the inner yoke, thereby efficiently acquiring the generated force.

A sixth mode of the present invention provides the vibration-damping electromagnetic actuator according to the fourth or fifth mode, wherein the axial dimension of the thick part of the at least one inner yoke is larger than an axial dimension of the magnetic gap so that the inner yoke and the inner tubular part of the outer yoke are superposed to one another as viewed in an axis-perpendicular direction, and the axial dimension of the thin part of the inner yoke is smaller than the axial dimension of the magnetic gap.

According to the sixth mode, the thin part of the inner yoke is thin enough to advantageously lighten the mover. While the thin part of the inner yoke is thinner than the axial dimension of the magnetic gap, the thick part at the outer peripheral part of the inner yoke is disposed close enough to the inner tubular part of the outer yoke. Thus, the magnetic force acting between the inner yoke and the outer yoke is effectively generated.

Also, the present invention is preferably constructed such that when the mover is in a stable axial position relative to the stator, the axial outside face of the thin part of the mover is positioned on the axial inside in relation to the axial outside end of the magnetic gap of the stator, while the axial outside face of the thick part of the mover is positioned on the axial outside in relation to the same. Moreover, when stably positioned in this way, the axial outside face of the thin part of the mover is preferably positioned on the axial outside in relation to the axial inside end of the magnetic gap of the stator, while the axial outside face of the thick part of the mover is preferably positioned on the axial inside in relation to the axial outside face of the stator.

A seventh mode of the present invention provides an active fluid-filled vibration-damping device comprising: a first mounting member; a second mounting member; a main rubber elastic body elastically connecting the first and second mounting members; a fluid chamber whose wall is partially constituted by the main rubber elastic body with a non-compressible fluid sealed therein; an oscillation member constituting another part of the wall of the fluid chamber; and the vibration-damping electromagnetic actuator according to any one of the first to sixth modes being attached to the oscillation member via the mover of the vibration-damping electromagnetic actuator so that oscillation force generated by the vibration-damping electromagnetic actuator is applied to the fluid chamber through the oscillation member.

According to the active fluid-filled vibration-damping device structured following the seventh mode, the thick part of the inner yoke and the outer yoke are closely disposed, whereby the active oscillation force exerted on the fluid chamber by the vibration-damping electromagnetic actuator is exhibited by a volume large enough. Additionally, the weight reduction of the inner yoke is attained by the lightening part, enabling oscillation control at a more higher frequency range. Thus, it is possible to obtain a good vibration-damping effect also on the target vibration subject to damping at the higher frequency.

An eighth mode of the present invention provides an active vibration-control device comprising the vibration-damping electromagnetic actuator according to any one of the first to sixth modes, wherein the stator is configured to be attached to a member subject to vibration-damping, and the stator and the mover are elastically connected to each other by a support rubber elastic body.

According to the active vibration-control device structured following the eighth mode, the thick part of the inner yoke and the outer yoke are closely disposed, thereby allowing the vibration-damping electromagnetic actuator to exert the active oscillation force on the member subject to vibration-damping with a volume large enough. Besides, the weight reduction of the inner yoke is attained by the lightening part, enabling oscillation control at a more higher frequency range. Thus, it is possible to obtain a good vibration-damping effect also on the target vibration subject to damping at the higher frequency.

According to the present invention, the outer peripheral part of the inner yoke constituting the mover is the thick part with a great axial dimension. This thick part allows the strong magnetic force to affect between the inner yoke and the outer yoke during the energization to the coil, thereby efficiently acquiring the target generated force. Moreover, the lightening part is provided in the inner peripheral part of the inner yoke, whereby the axial dimension of the inner yoke is smaller in the formation part of the lightening part than in the thick part. This decreases the weight of the inner yoke, thereby enabling control of the displacement of the mover relative to the stator at a higher frequency as well.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

There will be described below embodiments of the present invention while referring to the drawings.

Figure 1:
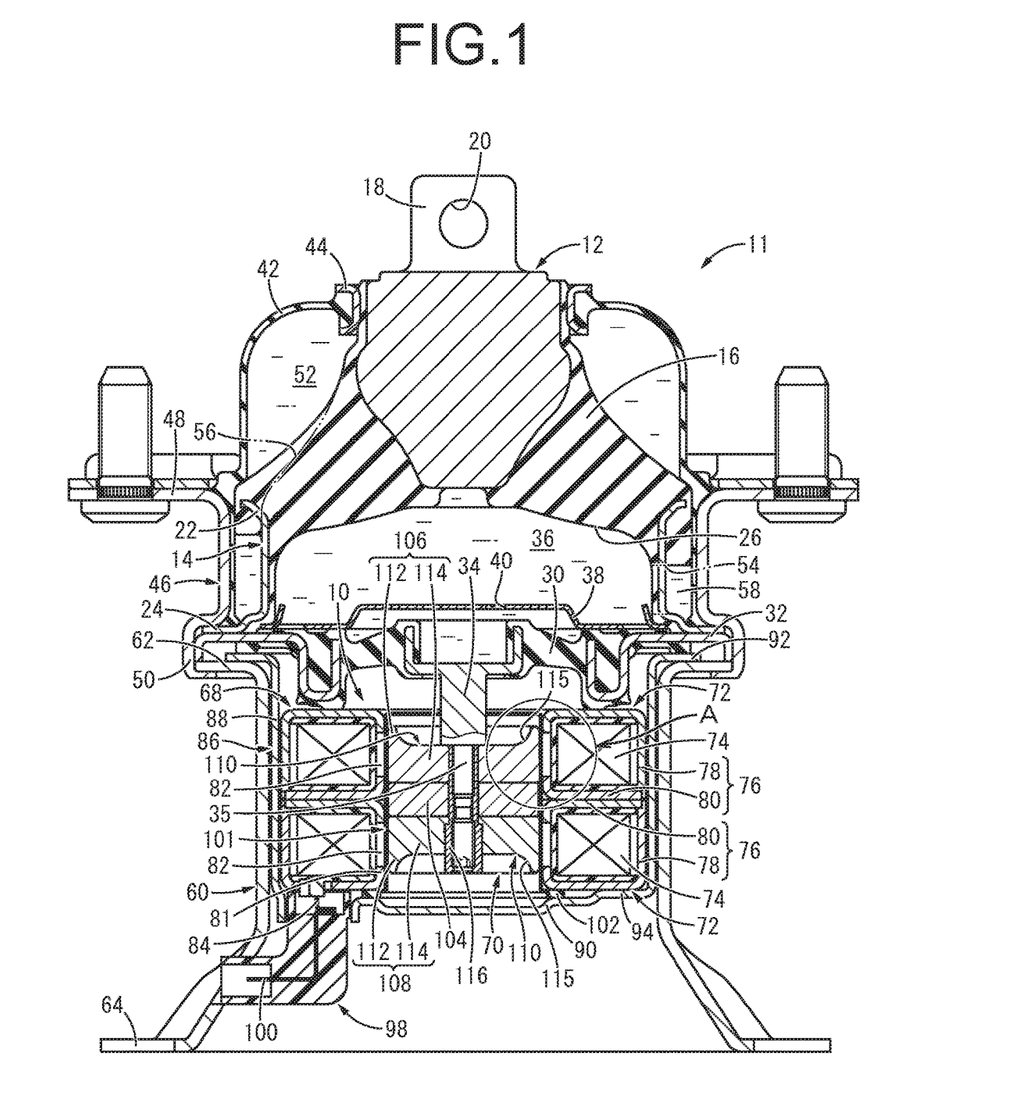
FIG. 1 is a longitudinal cross sectional view showing an active fluid-filled vibration-damping device in the form of an engine mount as a first embodiment of the present invention.

FIG. 1 shows an active fluid-filled vibration-damping device in the form of an engine mount 11, which is provided with a vibration-damping electromagnetic actuator 10 according to the present invention, as a first embodiment of the present invention. The engine mount 11 comprises a first mounting member 12, a second mounting member 14, and a main rubber elastic body 16 elastically linking them to each other. In the explanation hereinafter, unless otherwise stated, the up-down direction means the up-down direction in FIG. 1, which is the direction of displacement of a mover 70 relative to a stator 68 described later.

In more detail, the first mounting member 12 is a high rigidity member formed of a metal, a synthetic resin or the like in a shape of a block extending in the up-down direction with a substantially circular cross section. A plate-shaped attachment piece 18 is integrally formed with the first mounting member 12 so as to protrude upward, and a bolt hole 20 is formed through the attachment piece 18.

The second mounting member 14 is a member with high rigidity like the first mounting member 12, which extends in the circumferential direction with a longitudinal cross section of a groove shape opening toward the outer periphery. The whole second mounting member 14 has an approximately thin-walled, large-diameter cylindrical shape. The upper end of the second mounting member 14 is a tapered portion 22 that expands as it goes to the upper side, while the lower end thereof is a caulking plate 24 in a shape of an annular plate.

The first mounting member 12 is disposed above the second mounting member 14, and the main rubber elastic body 16 is disposed between those first mounting member 12 and second mounting member 14. The main rubber elastic body 16 has a substantial shape of a thick-walled, truncated cone. The small-diameter side end portion of the main rubber elastic body 16 is bonded by vulcanization to the first mounting member 12, while the large-diameter side end portion of the main rubber elastic body 16 is bonded by vulcanization to the second mounting member 14. The main rubber elastic body 16 of this embodiment takes the form of an integrally vulcanization molded component incorporating the first mounting member 12 and the second mounting member 14.

This main rubber elastic body 16 has a large-diameter recess 26 formed therein. The large-diameter recess 26 is a recess with a circular transverse cross section that opens on the axial end surface on the large-diameter side of the main rubber elastic body 16. The upper base wall surface of the main rubber elastic body 16 has a tapered shape with its diameter reduced as it goes upward. The diameter of the large-diameter recess 26 is smaller than the inside diameter of the second mounting member 14, whereby the inner peripheral surface of the second mounting member 14 is covered with a rubber layer of about cylindrical shape, which is formed integrally with the main rubber elastic body 16. Moreover, the upper end of the second mounting member 14 including the tapered portion 22 is covered with the main rubber elastic body 16 up to its outer peripheral side, so that it is bonded to the main rubber elastic body 16 as buried therein.

To this integrally vulcanization molded component of the main rubber elastic body 16, a support rubber elastic body 30 is attached. The support rubber elastic body 30 has an approximately annular plate shape, wherein an annular support fitting 32 is bonded by vulcanization to its outer periphery. The support fitting 32 has a groove shaped inner periphery that is bonded to the outer periphery of the support rubber elastic body 30. The support fitting 32 also has an outer periphery of about annular plate shape that is overlapped with the caulking plate 24 of the second mounting member 14 from below. Also, to the inner periphery of the support rubber elastic body 30, an output member 34 as an oscillation member is bonded by vulcanization, thereby closing off the central hole of the support rubber elastic body 30. In addition, the output member 34 has a structure wherein the lower part in a rod shape extends axially downward from the upper part in a bowl-like shape. The lower end of the output member 34 is provided with a male screw 35 which has a screw thread formed on its outer peripheral face.

The support rubber elastic body 30 incorporating the support fitting 32 and the output member 34 is attached to the integrally vulcanization molded component of the main rubber elastic body 16, whereby the large-diameter recess 26 of the main rubber elastic body 16 is covered by the support rubber elastic body 30 in a fluidtight manner. Thus, these main rubber elastic body 16, support rubber elastic body 30, and output member 34 define a primary liquid chamber 36 as a fluid chamber using the large-diameter recess 26. For the primary liquid chamber 36, a part of the wall thereof is constituted by the main rubber elastic body 16, while another part of the wall thereof is constituted by the support rubber elastic body 30 and the output member 34, and a non-compressible fluid or liquid is sealed therein. The non-compressible fluid sealed in the primary liquid chamber 36 is not limited to a particular fluid. Examples of preferably adopted fluid are liquids such as water, ethylene glycol, alkylene glycol, polyalkylene glycol, silicone oil, and a mixture liquid of them. Moreover, a low-viscosity fluid having viscosity of 0.1 Pa·s or lower is desirable, for advantageously obtaining a vibration-damping effect based on fluid flowing action described later. Filling of the non-compressible fluid in the primary liquid chamber 36 can be easily realized, for example by press-fitting the support fitting 32 into a caulking piece 50 of an outer caulking fitting 46 described later in a cistern filled with the non-compressible fluid. This filling can be realized by alternatively possible means. For example, an injection hole is formed in the first mounting member 12 etc., previously. The integrally vulcanization molded component of the main rubber elastic body 16, an integrally vulcanization molded component of a flexible film 42 (which will be described later), and the integrally vulcanization molded component of the support rubber elastic body 30 are assembled with the outer caulking fitting 46. After the assembly, the fluid is injected into the primary liquid chamber 36 via the injection hole, and then the injection hole is sealed.

In the present embodiment, a partition fitting 38 is disposed between the support rubber elastic body 30 and the main rubber elastic body 16. The partition fitting 38 has a generally thin disk shape, wherein the outer periphery is superposed on the upper surface of the support fitting 32 via the rubber elastic body, while the radially inner part is positioned higher than the outer periphery and separated upward from the support rubber elastic body 30 and the output member 34. Besides, the radially inner part of the partition fitting 38 is provided with a plurality of filter orifices 40 that are small-diameter circular holes penetrating therethrough in the thickness direction.

Also, to the integrally vulcanization molded component of the main rubber elastic body 16, the flexible film 42 is fixed. The flexible film 42, which is a thin rubber film being readily flexibly deformed, takes an approximately annular shape extending continuously in the circumferential direction as a whole, with its longitudinal cross sectional shape being convex toward the outer periphery. The flexible film 42 is bonded by vulcanization to an inner mating fitting 44 at its upper end part (the inner periphery) thereof, and to an outer caulking fitting 46 at its lower end part (the outer periphery).

The inner mating fitting 44 is an annular metal fitting that extends continuously across the entire periphery with a cross sectional shape of a groove that is concave opening toward the outer periphery. The upper end part of the flexible film 42 is bonded by vulcanization on the outer peripheral surface of the inner mating fitting 44. The inner mating fitting 44 is fitted externally onto the first mounting member 12, so that the upper end part of the flexible film 42 is attached to the first mounting member 12.

The outer caulking fitting 46 has a generally cylindrical shape having a large-diameter as a whole, and the flexible film 42 is bonded by vulcanization on the inner peripheral surface of the outer caulking fitting 46. The upper end part of the outer caulking fitting 46 integrally includes a flange 48 that expands radially outward. The lower end part of the outer caulking fitting 46 has a step and the caulking piece 50 that projects downward from the outer peripheral end of the step. The caulking piece 50 of the outer caulking fitting 46 is fastened by caulking to the caulking plate 24 of the second mounting member 14, whereby the lower end part of the flexible film 42 is fixed to the second mounting member 14. The upper end of the second mounting member 14 is abutted against the outer caulking fitting 46 in the axis-perpendicular direction via the rubber elastic bodies, thereby sealing a gap between the upper end of the second mounting member 14 and the outer caulking fitting 46 in a fluidtight manner. In addition, the outer peripheral part of the support fitting 32 that is bonded to the support rubber elastic body 30 is fastened by caulking together with the caulking plate 24 of the second mounting member 14 using the caulking piece 50 of the outer caulking fitting 46, so that it is fixed to the second mounting member 14.

Thus, the upper end part of the flexible film 42 is attached to the first mounting member 12, while the lower end part of the flexible film 42 is attached to the second mounting member 14. Consequently, the flexible film 42 is disposed externally about the main rubber elastic body 16. The flexible film 42 defines an auxiliary liquid chamber 52 together with the main rubber elastic body 16 and divides the chamber from the outside fluidtightly. The auxiliary liquid chamber 52 can change its volume easily with its wall being partially constituted by the flexible film 42 and is filled with the same non-compressible fluid as that of the primary liquid chamber 36.

The engine mount 11 further includes a tunnel-shaped passage extending peripherally continuously between the axially medial section surfaces of the second mounting member 14 and the outer caulking fitting 46, which are opposite in the axis-perpendicular direction. The tunnel-shaped passage communicates with the primary liquid chamber 36 through a first communication passage 54 formed at a part on the periphery. This passage also communicates with the auxiliary liquid chamber 52 through a second communication passage 56 formed at another part on the periphery. Consequently, an orifice passage 58 is formed to communicate the primary liquid chamber 36 and the auxiliary liquid chamber 52 with one another, between the second mounting member 14 and the outer caulking fitting 46. The tuning frequency of the orifice passage 58 that is the resonance frequency of the flowing fluid is set as appropriate, by adjusting the ratio (A/L) of the passage cross sectional area (A) to the passage length (L) using the wall spring rigidity for the primary liquid chamber 36 and the auxiliary liquid chamber 52. In the present embodiment, the tuning frequency is tuned to about 10 Hz corresponding to engine shake. Note that a not-shown partition wall, which is formed integrally with the main rubber elastic body 16, is fixed on the outer peripheral surface of the second mounting member 14. Therefore, the length of the tunnel-shaped passage is shorter than one periphery in the peripheral direction. Besides, the communication passages 54, 56 are each formed at the respective peripheral end of the tunnel-shaped passage.

Moreover, to the outer caulking fitting 46, a fastening fitting 60 is fixed. The fastening fitting 60 is, as a whole, in a shape of about cylinder having a large-diameter, wherein the upper end part thereof is provided with a flange-shaped connection plate 62, while the lower end part thereof is provided with a flange-shaped fixing plate 64. The connection plate 62 is fastened by caulking with the caulking piece 50 of the outer caulking fitting 46, thereby connecting the fastening fitting 60 to the outer caulking fitting 46. Thus, these outer caulking fitting 46 and fastening fitting 60 constitute the outer bracket. The connection plate 62 of the fastening fitting 60 is fastened by caulking together with the caulking plate 24 of the second mounting member 14 and the outer peripheral part of the support fitting 32, using the caulking piece 50. Consequently, the fastening fitting 60 is fixed to the second mounting member 14 and the support fitting 32.

Within the fastening fitting 60, the vibration-damping electromagnetic actuator 10 is disposed. The vibration-damping electromagnetic actuator 10 has a structure wherein the stator 68 and the mover 70, which are relatively displaceable in the axial direction, are disposed such that one is positioned within the other.

Figure 2:
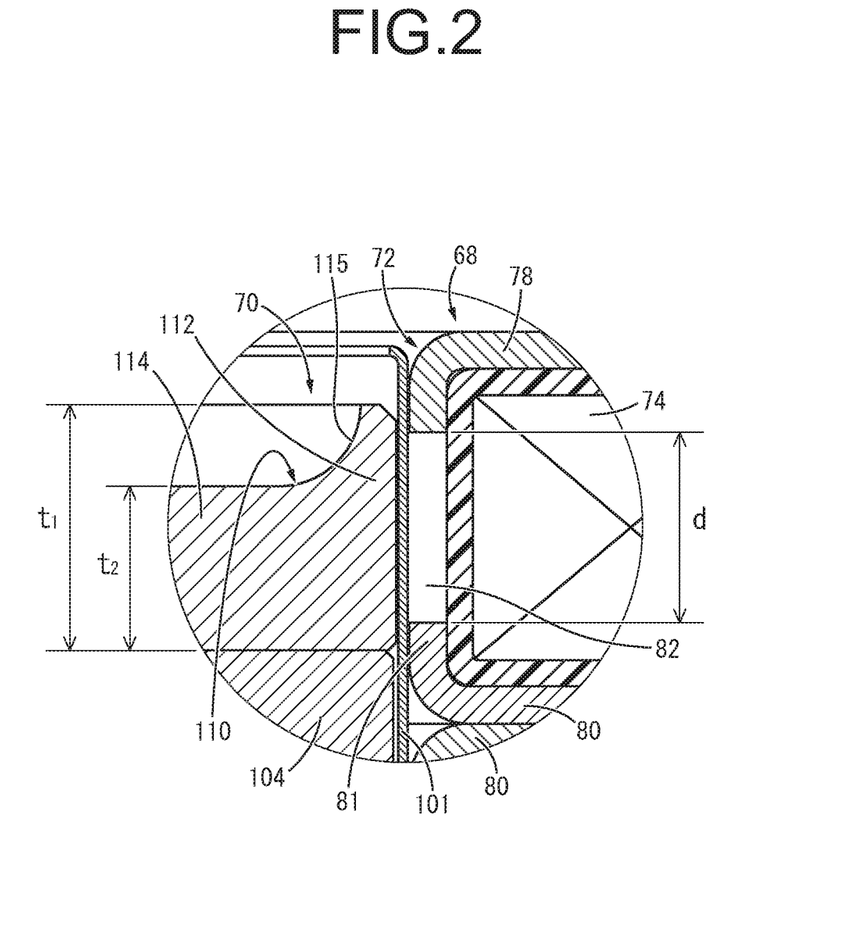
FIG. 2 is a fragmentary enlarged view of a principal part of the engine mount shown in FIG. 1, showing Part A of FIG. 1 as enlarged.

The stator 68 has two coil members 72, 72 that are arranged in an up-down two stage manner. The coil member 72 includes a coil 74 that is constituted by a bobbin formed of a resin wound by a conductive metal wire, and an outer yoke 76 that is attached to the coil 74. The coil member 72, as a whole, has a shape of nearly circular tube having a large-diameter.

The outer yoke 76, which is formed of a ferromagnetic material like iron, includes a first yoke 78 to be overlapped with the axial outer surface of the coil 74 and a second yoke 80 to be overlapped with the axial inner surface of the coil 74. More specifically, the first yoke 78 is attached as covering the axial outer surface, the outer peripheral surface and the axial outer edge portion of the inner peripheral surface in the coil 74. The second yoke 80 is attached as covering the axial inner surface and the axial inner edge portion of the inner peripheral surface in the coil 74. Owing to this, the outer yoke 76 forms a magnetic path guiding a magnetic flux generated by energization to the coil 74 around the coil 74.

In the outer yoke 76, an inner tubular part 81 is superposed on the inner peripheral face of the coil 74. In the inner tubular part 81, the first yoke 78 and the second yoke 80 are separated in the up-down direction. In other words, a magnetic gap 82 is formed between the first yoke 78 and the second yoke 80 in the inner tubular part 81. For the inner tubular part 81 of this embodiment, the axial dimension from the magnetic gap 82 to the axially outer end in the first yoke 78 is substantially the same as the axial dimension from the magnetic gap 82 to the axially inner end in the second yoke 80.

Owing to power feed to the coils 74, 74, the magnetic flux is generated around the coils 74, 74 and guided by the magnetic path constituted by the outer yokes 76, 76. Accordingly, magnetic poles are formed in the inner tubular part 81 of the outer yoke 76 on both axial sides of the magnetic gap 82. The coil 74 of the upper coil member 72 and the coil 74 of the lower coil member 72 are formed with a continuous wire which is wound around the bobbins in the adverse directions relative to each other, thereby generating the magnetic flux in the adverse directions owing to the energization. Also, the upper and lower coil members 72, 72 are substantially symmetrical to one another in structure, except that the lower coil member 72 is provided with a coil terminal fitting 84 projecting downward, which is electrically connected to the coil 74.

The stator 68 is housed peripherally inside a housing 86. The housing 86, roughly in a bottomed cup shape as a whole, is provided integrally with a peripheral wall 88 of nearly cylindrical shape, a bottom wall 90 of nearly circular disk shape, and a support piece 92 of flange shape formed at its opening. In the present embodiment, the bottom wall 90 of the housing 86 has a shape of a stepped plate which is positioned gradually higher as it goes toward the outer periphery. Specifically, for this bottom wall 90, the outer peripheral edge portion is a stator support part 94 with an annular plate shape that is abutted against the stator 68.

In this embodiment, the stator 68 is clamped between the inner peripheral part of the support fitting 32 and the stator support part 94 of the bottom wall 90 of the housing 86 in the axial direction, whereby the stator 68 is securely positioned such that it is not displaceable relative to the housing 86. The lower surface of the inner peripheral part of the support fitting 32 in a groove shape is covered with a clasped rubber, which is formed integrally with the support rubber elastic body 30. This abuts the first yoke 78 of the upper coil member 72 indirectly to the support fitting 32 via the clasped rubber.

In a state where the stator 68 is attached to the housing 86, the coil terminal fitting 84 connects with a connector 98, which is mounted to the housing 86. The connector 98 is mounted at a connection hole, which is formed in the outer peripheral portion of the bottom wall 90 of the housing 86, extending downward from the hole and bending at its medium part so as to protrude sideward. This connector 98 is provided with a connector terminal fitting 100, for which one end is in conductive contact with the coil terminal fitting 84, while the other end is exposed to the outside.

Furthermore, a guide sleeve 101 is disposed as inserted in the central hole of the stator 68. The guide sleeve 101 is a member of a substantially thin circular tube shape formed of such a material as a nonmagnetic stainless steel. Preferably, the surface of the guide sleeve 101 is subjected to a low friction surface treatment like fluororesin coating. The lower end of the guide sleeve 101 is provided with a fixation part of a large-diameter tubular shape. An elastic support body 102 is fixed to this fixation part so as to project to the outer periphery. The elastic support body 102 is clamped in the axial direction between the coil member 72 and the bottom wall 90 of the housing 86, whereby the guide sleeve 101 is elastically supported by the stator 68.

The mover 70 is inserted in the guide sleeve 101. The mover 70 has an armature including a permanent magnet 104 and an upper yoke 106 and a lower yoke 108 as inner yokes that overlap the upper and lower sides of the permanent magnet 104, respectively. The permanent magnet 104 has a substantial shape of an annular plate, with both upper and lower flat faces expanding in the axis-perpendicular direction. The permanent magnet 104 is magnetized in the axial direction, thereby having the respective one of two magnetic poles formed on each of the upper and lower surfaces. Note that, as the permanent magnet 104, although a ferrite based magnet, an alnico based magnet and the like can be adopted, preferably adopted is a rare-earth cobalt based magnet such as a samarium-cobalt magnet, which can have great coercive force despite its smallness and lightness.

The upper yoke 106 is formed of a ferromagnetic material like iron to which a low friction surface treatment including fluororesin coating is applied. The upper yoke 106 has a generally annular plate shape as a whole. For the upper yoke 106, the lower surface that should be superposed on the permanent magnet 104 is a flat face expanding in the axis-perpendicular direction, while the upper surface has a lightening part 110 in a recess shape opening at its inner peripheral part. As a result, the axial dimension of the formation part of the lightening part 110 is smaller than the axial dimension of the part other than the lightening part 110 in the upper yoke 106. Thus, the outer peripheral part of the upper yoke 106 that is apart on the outer peripheral side from the lightening part 110 is a thick part 112 that has a large axial dimension. On the other hand, the entire inner peripheral side part of the thick part 112 where the lightening part 110 is formed is a thin part 114 that has an axial dimension smaller than that of the thick part 112. The lower yoke 108 has a structure of the upper yoke 106 turned upside down while having the lightening part 110, the thick part 112, and the thin part 114 in the same way as the upper yoke 106. For this reason, the explanation about the lower yoke 108 is omitted by giving the same code numbers in the drawings.

In the structure of the upper yoke 106 of the present embodiment, the thick part 112 is provided in a ring shape to extend continuously across the entire periphery in the peripheral direction, while the thin part 114 is provided integrally with the thick part 112 of nearly annular plate shape on the inner peripheral side of the thick part 112. As a result, the upper yoke 106 has a substantially constant cross sectional shape across the entire periphery. In this embodiment, an outer face 115 of the outer peripheral end of the thin part 114 is an incline that slants upward as it goes to the outer peripheral side, so that the axial dimension of the outer peripheral end of the thin part 114 gets larger as it goes to the outer peripheral side. Especially, its inclination angle gets larger as it goes to the outer peripheral side, whereby the outer face 115 of the outer peripheral end of the thin part 114 is a curved incline that has a curved longitudinal cross sectional shape. In the present embodiment, the both axial edge corner of the outer peripheral end of the thick part 112 are beveled. By so doing, the axial dimension of the outer peripheral end of the thick part 112 is reduced as it goes to the outer peripheral side.

In the upper yoke 106, the axial dimension of the thick part 112 ($t_1$) is larger than the axial dimension of the magnetic gap 82 of the upper coil member 72 (d), while the axial dimension of the thin part 114 ($t_2$) is smaller than the axial dimension of the magnetic gap 82 (d) ($t_2 < d < t_1$). In the same way, in the lower yoke 108, the axial dimension of the thick part 112 is larger than the axial dimension of the magnetic gap 82 of the lower coil member 72, while the axial dimension of the thin part 114 is smaller than the axial dimension of the magnetic gap 82. For the present embodiment, the upper yoke 106 and the lower yoke 108 have the same structure toward the opposite directions to each other in the up-down direction. Consequently, the upper yoke 106 and the lower yoke 108 have substantially the same axial dimensions for the thick part 112 and the thin part 114. Additionally, the magnetic gap 82 of the upper coil member 72 and the magnetic gap 82 of the lower coil member 72 have substantially the same axial dimension.

The upper yoke 106 overlaps the upper surface of the permanent magnet 104, while the lower yoke 108 overlaps the lower surface of the permanent magnet 104 across the whole shape. These permanent magnet 104 and upper and lower yokes 106, 108 are connected to one another by a position adjustment nut 116 being press-fitted into the central holes thereof. Consequently, the upper and lower yokes 106, 108 are magnetized by the magnetic field of the permanent magnet 104, thereby providing the opposite magnetic poles on the outer peripheral surface of the upper yoke 106 and the outer peripheral surface of the lower yoke 108, respectively. The position adjustment nut 116 has a substantial shape of a small-diameter circular tube, with a screw thread on the inner peripheral surface. This position adjustment nut 116 has a larger diameter in the axially lower section than in the upper section, with the outer peripheral surface varying accordingly. The lower section with the larger diameter axially touches a step formed on the inner peripheral surface of the lower yoke 108. This axially positions the position adjustment nut 116 in relation to the permanent magnet 104 and the upper and lower yokes 106, 108.

About this mover 70, the stator 68 in a tubular shape is externally disposed so that the mover 70 is displaceable relative to the stator 68 in the axial direction. The mover 70 is axially positioned in relation to the stator 68 so that the axial center of the thick part 112 of the upper yoke 106 is aligned with the axial center of the magnetic gap 82 of the upper coil member 72, while the axial center of the thick part 112 of the lower yoke 108 is aligned with the axial center of the magnetic gap 82 of the lower coil member 72. By so doing, when positioned stably in the axial direction, the both upper and lower ends of the thick part 112 of the upper yoke 106 are superposed to the inner tubular part 81 in the outer yoke 76 of the upper coil member 72 as viewed in the axis-perpendicular direction. Meanwhile, when positioned stably in the axial direction, the both upper and lower ends of the thick part 112 of the lower yoke 108 are superposed to the inner tubular part 81 in the outer yoke 76 of the lower coil member 72 as viewed in the axis-perpendicular direction.

In the present embodiment, when the mover 70 is stably positioned in the axial direction relative to the stator 68, the axial outside face of the thin part 114 of the mover 70 is positioned further axially inside than the axial outside end of the magnetic gap 82 of the stator 68, at least in a portion, e.g., the inner peripheral side of the outer face 115. In the same state, the axial outside face of the thick part 112 of the mover 70 is positioned further axially outside than the axial outside end of the magnetic gap 82. Moreover, when positioned stably in this way, the whole axial outside face of the thin part 114 is located further axially outside than the axial inside end of the magnetic gap 82, the axial outside face of the thick part 112 is located further axially inside than the axial outside face of the coil member 72.

The coils 74, 74 are supplied with power from a not-shown power supply device connected to the connector 98, thereby each forming a magnetic field to magnetize each of the outer yokes 76, 76. This generates a magnetic force between the upper and lower yokes 106, 108 of the mover 70 and the respective outer yokes 76, 76. Therefore, the mover 70 is displaced relative to the stator 68 in the axially up-down direction. A not-shown control device switches the direction of the current supplied for the coils 74, 74 from the power supply device at a set timing, thereby controlling the direction of displacement of the mover 70 relative to the stator 68, i.e., oscillation frequency.

In the vibration-damping electromagnetic actuator 10 with this structure, the housing 86 is attached to the outer caulking fitting 46, while the mover 70 is attached to the output member 34.

Specifically, as for the housing 86, the support piece 92 provided for its upper end opening is inserted into a gap in the axial direction between the connection plate 62 of the fastening fitting 60 and the outer peripheral part of the support fitting 32. The connection plate 62 and the outer peripheral part of the support fitting 32 are fastened by caulking with the caulking piece 50 of the outer caulking fitting 46, so that the support piece 92 is fixed to the outer caulking fitting 46. This caulking attaches the housing 86 provided with the support piece 92 to the second mounting member 14 via the outer caulking fitting 46. The fastening fitting 60 is mounted to a not-shown vehicle body as described later, and thus the housing 86 is supported on the side of the vehicle body.

Meanwhile, the mover 70 is fixed in a predetermined axial position relative to the output member 34, by threading a male screw 35 provided at the lower end part of the output member 34 onto the position adjustment nut 116, while threading a locking bolt into the position adjustment nut 116 from below. Suitable adjustment in the screwing amount of the position adjustment nut 116 relative to the male screw 35 enables adjustment in the axial position of the mover 70 relative to the output member 34. Variety of axial position of the output member 34 would not affect the positioning of the mover 70 in a predetermined axial position relative to the stator 68.

For the engine mount 11 of this structure, the first mounting member 12 is mounted, via a not-shown inner bracket fixed to the attachment piece 18 with bolt, on a power unit that is not shown either, while the second mounting member 14 is mounted via the fastening fitting 60 on the not-shown vehicle body. Consequently, the engine mount 11 is interposed between the power unit and the vehicle body, so that the power unit is supported by the vehicle body in a vibration-damping manner.

Upon input of a low-frequency, large-amplitude vibration corresponding to engine shake, internal pressure fluctuation is induced in the primary liquid chamber 36. Relative pressure difference between the primary liquid chamber 36 and the auxiliary liquid chamber 52 causes a fluid flow between the both chambers 36, 52 through the orifice passage 58. This exerts vibration-damping effect on the basis of flow action like fluid resonance action.

Upon input of a medium- to high-frequency, small-amplitude vibration such as idling vibration (about some dozen Hz) or driving rumble (about 30 Hz to 200 Hz), for example, the orifice passage 58 is substantially closed by antiresonance. Meanwhile, the output member 34 constituting a part of the wall of the primary liquid chamber 36 is oscillated by the vibration-damping electromagnetic actuator 10 in the axial direction, thereby applying the oscillation force to the primary liquid chamber 36. As a result, the actively applied oscillation force cancels the input vibration, thereby yielding the target vibration-damping effect. In the present embodiment, the oscillation force is applied on the primary liquid chamber 36 through the filter orifices 40, thereby exhibiting active vibration-damping effect owing to the oscillation more efficiently.

According to the engine mount 11 structured following the present embodiment, in the mover 70 of the vibration-damping electromagnetic actuator 10, the outer periphery of the upper yoke 106 and the lower yoke 108 are the thick parts 112 that have large axial dimensions. Therefore, it is possible to dispose each of the outer peripheral parts of the upper and lower yokes 106, 108 close to the end of the magnetic gap 82 formed at the inner tubular part 81 of the corresponding coil member 72. This enables the magnetic force to act strongly between the upper and lower yokes 106, 108 and the inner tubular parts 81 of the respective coil members 72, during the energization to each of the coils 74. As a result, the target generated force is efficiently obtained, so that active vibration-damping action is favorably acquired.

In addition, the lightening part 110 is provided at each of the inner peripheral parts of the upper and lower yokes 106, 108, thereby making the axial dimensions of the upper and lower yokes 106, 108 smaller in the formation parts of the lightening parts 110 than in the thick parts 112. By so doing, the upper and lower yokes 106, 108 are lightened, whereby control of the displacement of the mover 70 relative to the stator 68 can be realized at a higher frequency range.

Therefore, it is possible to effectively attain the vibration-damping effect owing to the active oscillation force exerted on the primary liquid chamber 36, in relation to input of the vibration of a wider frequency range.

With respect to the upper and lower yokes 106, 108, the axial end face is superposed on the permanent magnet 104, while the outer peripheral face is disposed on the side of the inner tubular part 81 of the outer yoke 76. This means that the magnetic flux density of the inner peripheral part is smaller than that of the outer peripheral part, in the upper and lower yokes 106, 108. Therefore, the lightening part 110 is formed in the inner peripheral part for the upper and lower yokes 106, 108, while the outer peripheral part is the thick part 112 having a large axial dimension, thereby preventing a decrease of the generated force due to saturation of the magnetic flux.

For the vibration-damping electromagnetic actuator 10 of this embodiment, the stator 68 has a structure wherein the two coil members 72, 72 are superposed in the up-down direction, while the mover 70 has a structure wherein the two upper and lower yokes 106, 108 are superposed to the permanent magnet 104. During the energization to each coil 74 for the two coil members 72, 72, the generated force is caused between the upper yoke 106 and the inner tubular part 81 of the upper coil member 72, as well as between the lower yoke 108 and the inner tubular part 81 of the lower coil member 72. Consequently, it becomes possible to more advantageously obtain the target generated force. Additionally, the thick part 112 and the lightening part 110 (hence the thin part) are provided for both the upper and lower yokes 106, 108. Owing to this, the weight reduction of the mover 70 is realized also with the structure wherein the upper and lower yokes 106, 108 are superposed on the opposite faces of the permanent magnet 104. Thus, inertia is kept to be small, so that the response speed and accuracy are improved while the expansion of the frequency range wherein the operation is controllable is effectively realized.

Also, the lightening parts 110 have a recess shape that does not pierce the upper or lower yoke 106/108, so that the upper and lower yokes 106, 108 are superposed on the permanent magnet 104 with wider areas. This reduces magnetic flux leakage, thereby allowing the permanent magnet 104 to more efficiently magnetize the upper and lower yokes 106, 108, so that a great generated force can be acquired.

Besides, the lightening part 110 of this embodiment is formed in the entire inner peripheral part of each of the upper and lower yokes 106, 108. The entire inner peripheral parts of the upper and lower yokes 106, 108 are the thin parts 114, whereby the weight reduction of the upper and lower yokes 106, 108 is more effectively realized. Moreover, the thick part 112 is formed on the outer peripheral side of the lightening part 110 so as to be continuous across the whole periphery with a large axial dimension. This makes it possible to advantageously obtain the generated force exhibited during the energization to the coil 74. Furthermore, the superposed faces of the permanent magnet 104 and the upper and lower yokes 106, 108 are widely secured, whereby the magnetic flux of the permanent magnet 104 is guided efficiently to the upper and lower yokes 106, 108. Thus, a strong magnetization is caused in the upper and lower yokes 106, 108, so that the generated force can be efficiently obtained.

The axial dimension of the thin part 114 in each of the upper and lower yokes 106, 108 is small enough, thereby effectively lightening the mover 70. The thin parts 114 of the upper and lower yokes 106, 108 are thinner than the axial dimensions of the magnetic gaps 82. On the other hand, the axial dimensions of the thick parts 112 provided at the outer peripheral parts of the upper and lower yokes 106, 108 are larger than the axial dimensions of the magnetic gaps 82. As a result, the upper and lower yokes 106, 108 are each arranged close enough to the inner tubular part 81 of the corresponding outer yoke 76, thereby exhibiting the generated force efficiently.

Figure 3:
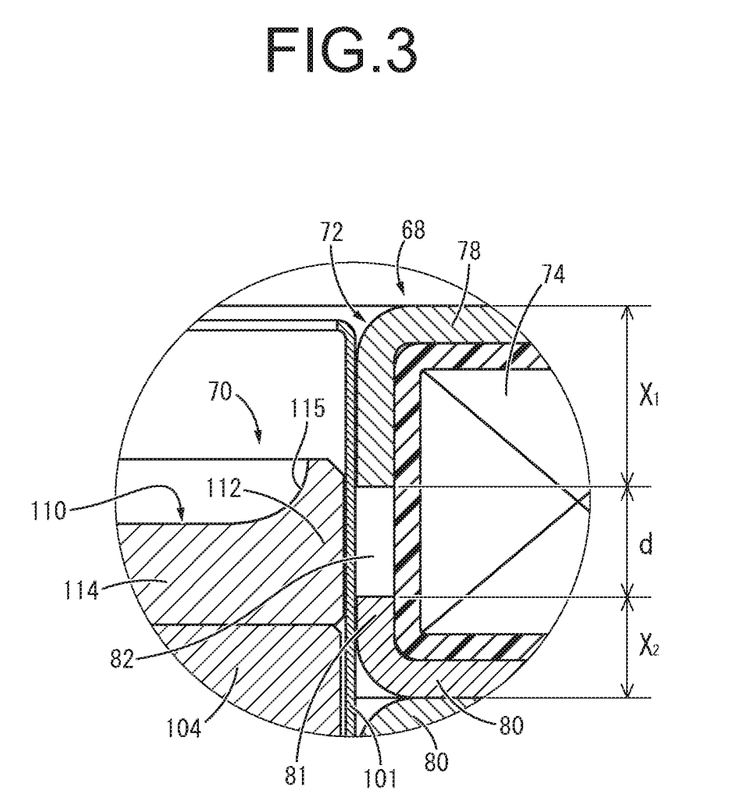
FIG. 3 is a fragmentary longitudinal cross sectional view of a vibration-damping electromagnetic actuator as another embodiment of the present invention, showing a principal part of the vibration-damping electromagnetic actuator as enlarged.

Although the embodiment of the present invention has been described above, this invention is not limited by the specific descriptions of the embodiment. For example, in the inner tubular part 81 with each outer yoke 76 of the upper and lower coil members 72, 72, the axial dimension of the first yoke 78 from the magnetic gap 82 to the axial outer end ($X_1$) can be larger than the axial dimension of the second yoke 80 from the magnetic gap 82 to the axial inner end ($X_2$) ($X_2 < X_1$), as shown in FIG. 3. According to this, it is possible to extend the axial dimension of the coil 74 without needing to extend the axial dimension of the magnetic gap 82 ($d$). Thus, the winding number of the coil 74 can be increased to intensify the magnetic field during the energization, thereby enabling obtainment of a great generated force. In addition, the mover 70 is avoided from becoming larger and heavier accordingly, whereby it becomes possible to control the oscillation at a wide frequency range.

The coil members 72 are not limited to the two coil members overlapped in the up-down direction. That is, it is also possible to provide only one coil member, for example. For this structure having one coil member, only one inner yoke, either upper or lower, needs to be provided.

The specific embodiment of the lightening part of the inner yoke is not limited to that of the present embodiment. Specifically, in an upper yoke 120 as an inner yoke shown in FIG. 4, a plurality (four, in FIG. 4) of lightening parts 122 are formed circumferentially spaced away from one another in a middle portion in the radial direction, while having a recess shape that extends in the up-down direction with a circular cross section. A thick part is formed at the outer peripheral side of the lightening parts 122 so as to be continuous across the entire periphery. Thin parts 126 are formed in formation parts of the lightening parts 122 with axial dimensions smaller than that of a thick part 124. Besides, in the upper yoke 120, the portion of the inner peripheral part that is apart from the thin parts 126 has the same axial dimension (thickness) as that of the thick part 124.

Figure 5:
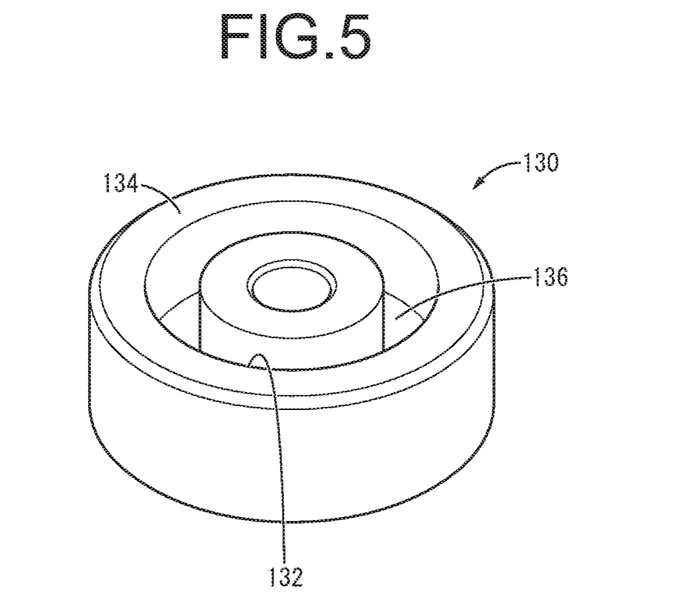
FIG. 5 is a perspective view showing an upper yoke of a vibration-damping electromagnetic actuator as still yet another embodiment of the present invention.

In an upper yoke 130, as an inner yoke shown in FIG. 5, a lightening part 132 is formed in a concave groove shape extending in the peripheral direction at the middle portion in the radial direction as continuous across the entire periphery. A thick part 134 is formed on the outer peripheral side of the lightening part 132 as continuous across the entire periphery, while a thin part 136 is formed at the formation part of the lightening part 132 with an axial dimension smaller than that of the thick part 134. In addition, for the upper yoke 130, the inner peripheral side part of the thin part 136 has the same axial dimension (thickness) as that of the thick part 134.

Figure 4:
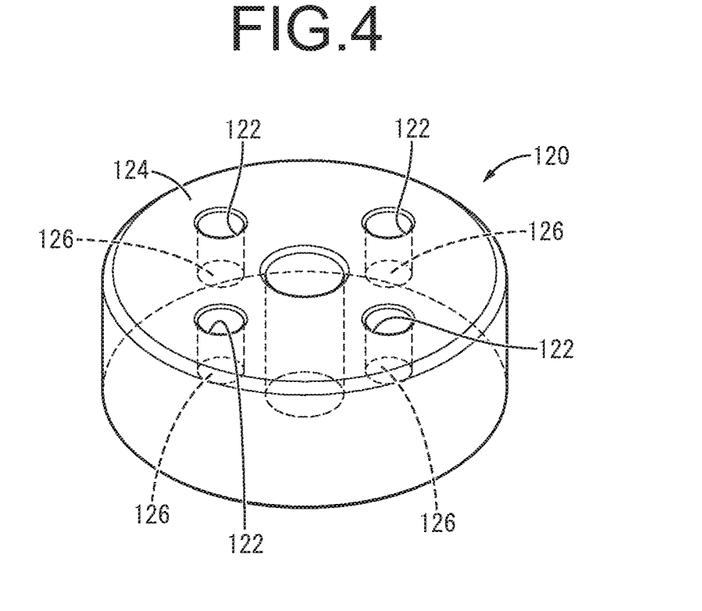
FIG. 4 is a perspective view showing an upper yoke of a vibration-damping electromagnetic actuator as yet another embodiment of the present invention.

Also in vibration-damping electromagnetic actuators using these upper yokes 120, 130 shown in FIGS. 4 and 5, it is possible to effectively control the operation at a higher frequency range owing to the weight reduction of the mover while effectively obtaining the generated force. As is apparent also from FIGS. 4 and 5, the lightening part need not be formed in the entire inner peripheral part of the inner yoke.

Moreover, the lightening part can have a hole shape piercing the inner yoke in the axial direction. In this case, the axial dimension of the inner yoke is zero in the formation part of the lightening part, that is, the axial dimension of the inner yoke is smaller in the formation part of the lightening part than in the thick part.

When the inner yokes are provided on the upper and lower sides of the permanent magnet 104, the structure wherein the lightening part 110 and the thick part 112 are formed for the both inner yokes as the aforesaid embodiment is adoptable, but a structure wherein the lightening part 110 and the thick part 112 are formed for either one inner yoke only is also included in the present invention.

The vibration-damping electromagnetic actuator 10 according to this invention can be used for an active fluid-filled vibration-damping device as shown in the aforesaid embodiment. In addition to that, this actuator is preferably used as well for an active vibration-control device shown in Japanese Unexamined Patent Publication No. JP-A-2013-060963, which is incorporated herein by reference, and other documents, for example. Specifically, for the vibration-damping electromagnetic actuator 10 according to this invention adopted for the active vibration-control device, the output member 34 attached to the mover 70 and the housing 86 attached to the stator 68 are elastically connected to each other by the support rubber elastic body 30. The stator 68 and the mover 70 are thus elastically connected to each other indirectly by the support rubber elastic body 30. The stator 68 is attached to a member subject to vibration-damping such as the vehicle body via the housing 86, whereby the oscillation force generated through the energization to the coil 74 is applied to the member subject to vibration-damping via the housing 86. Consequently, the active oscillation force reduces the vibration input upon the member subject to vibration-damping in an offset fashion.

What is claimed is:

1. A vibration-damping electromagnetic actuator comprising:
   a tubular stator including at least one coil member having a coil and an outer yoke attached to the coil;
   a mover including a permanent magnet and at least one inner yoke superposed on the permanent magnet in an axial direction of the tubular stator, the mover being inserted into the tubular stator such that the mover is displaceable relative to the tubular stator in the axial direction through energization to the coil; and
   an inner tubular part that is provided at the outer yoke and is superposed on an inner peripheral face of the coil such that a magnetic gap is formed at the inner tubular part,
   wherein:
      the at least one inner yoke has a thick part at an outer peripheral part thereof, and a lightening part provided at an inner peripheral part thereof, and an dimension of the lightening part is smaller than an axial dimension of the thick part, and
      the at least one coil member comprises two coil members and the tubular stator includes the two coil members superposed to one another in the axial direction, while the at least one inner yoke comprises two inner yokes, and the mover includes the two inner yokes superposed on opposite faces of the permanent magnet, and the thick part and the lightening part are provided in each of the inner yokes.

2. The vibration-damping electromagnetic actuator according to claim 1, wherein with respect to the inner tubular part of the outer yoke, an axial dimension from the magnetic gap to an axially outer end is greater than an axial dimension from the magnetic gap to an axially inner end.

3. The vibration-damping electromagnetic actuator according to claim 1,
wherein the lightening part has a recess shape.

4. An active fluid-filled vibration-damping device comprising:
a first mounting member;
a second mounting member;
a main rubber elastic body elastically connecting the first and second mounting members;
a fluid chamber whose wall is partially constituted by the main rubber elastic body with a non-compressible fluid sealed therein;
an oscillation member constituting another part of the wall of the fluid chamber; and
the vibration-damping electromagnetic actuator according to claim 1 being attached to the oscillation member via the mover of the vibration-damping electromagnetic actuator so that oscillation force generated by the vibration-damping electromagnetic actuator is applied to the fluid chamber through the oscillation member.

5. An active vibration-control device comprising the vibration-damping electromagnetic actuator according to claim 1,
wherein the tubular stator is configured to be attached to a member subject to vibration-damping, and the tubular stator and the mover are elastically connected to each other by a support rubber elastic body.

6. The vibration-damping electromagnetic actuator according to claim 1, wherein:
inner peripheral surfaces of the inner tubular part extend on both axial sides of the magnetic gap in a constant inside diameter dimension, and
an outer peripheral surface of the mover is opposed to the inner peripheral surfaces of the inner tubular part with a substantially constant space in a radial direction, and magnetic poles are formed on the outer peripheral surface of the mover due to the permanent magnet.

7. A vibration-damping electromagnetic actuator comprising:
a tubular stator including at least one coil member having a coil and an outer yoke attached to the coil;
a mover including a permanent magnet and at least one inner yoke superposed on the permanent magnet in an axial direction of the tubular stator, the mover being inserted into the tubular stator such that the mover is displaceable relative to the tubular stator in the axial direction through energization to the coil; and
an inner tubular part that is provided at the outer yoke and is superposed on an inner peripheral face of the coil such that a magnetic gap is formed at the inner tubular part,
wherein:
the at least one inner yoke has a thick part at an outer peripheral part thereof, and a lightening part having a recess shape at an inner peripheral part thereof, and an axial dimension of the lightening part is smaller than an axial dimension of the thick part, and
superposed faces of the permanent magnet and the at least one inner yoke are flat faces expanding in an axis-perpendicular direction, and the thick part is formed with a ring shape at the outer peripheral part of the at least one inner yoke so as to extend in a peripheral direction, while the lightening part is formed in the recess shape opening to an opposite face to the permanent magnet, across an entire inner peripheral side part of the thick part in the at least one inner yoke.

8. A vibration-damping electromagnetic actuator comprising:
a tubular stator including at least one coil member having a coil and an outer yoke attached to the coil;
a mover including a permanent magnet and at least one inner yoke superposed on the permanent magnet in an axial direction of the tubular stator, the mover being inserted into the tubular stator such that the mover is displaceable relative to the tubular stator in the axial direction through energization to the coil; and
an inner tubular part that is provided at the outer yoke and is superposed on an inner peripheral face of the coil such that a magnetic gap is formed at the inner tubular part,
wherein the at least one inner yoke has a thick part at an outer peripheral part thereof, and a lightening part provided at an inner peripheral part thereof, and an axial dimension of the lightening part is smaller than an axial dimension of the thick part, and
wherein the axial dimension of the thick part of the at least one inner yoke is larger than an axial dimension of the magnetic gap so that the at least one inner yoke and the inner tubular part of the outer yoke are superposed to one another as viewed in an axis-perpendicular direction, and the axial dimension of the lightening part of the at least one inner yoke is smaller than the axial dimension of the magnetic gap.

* * * * *